July 6, 1937.  H. M. TURNER  2,086,008
FISHING TACKLE
Filed May 11, 1934
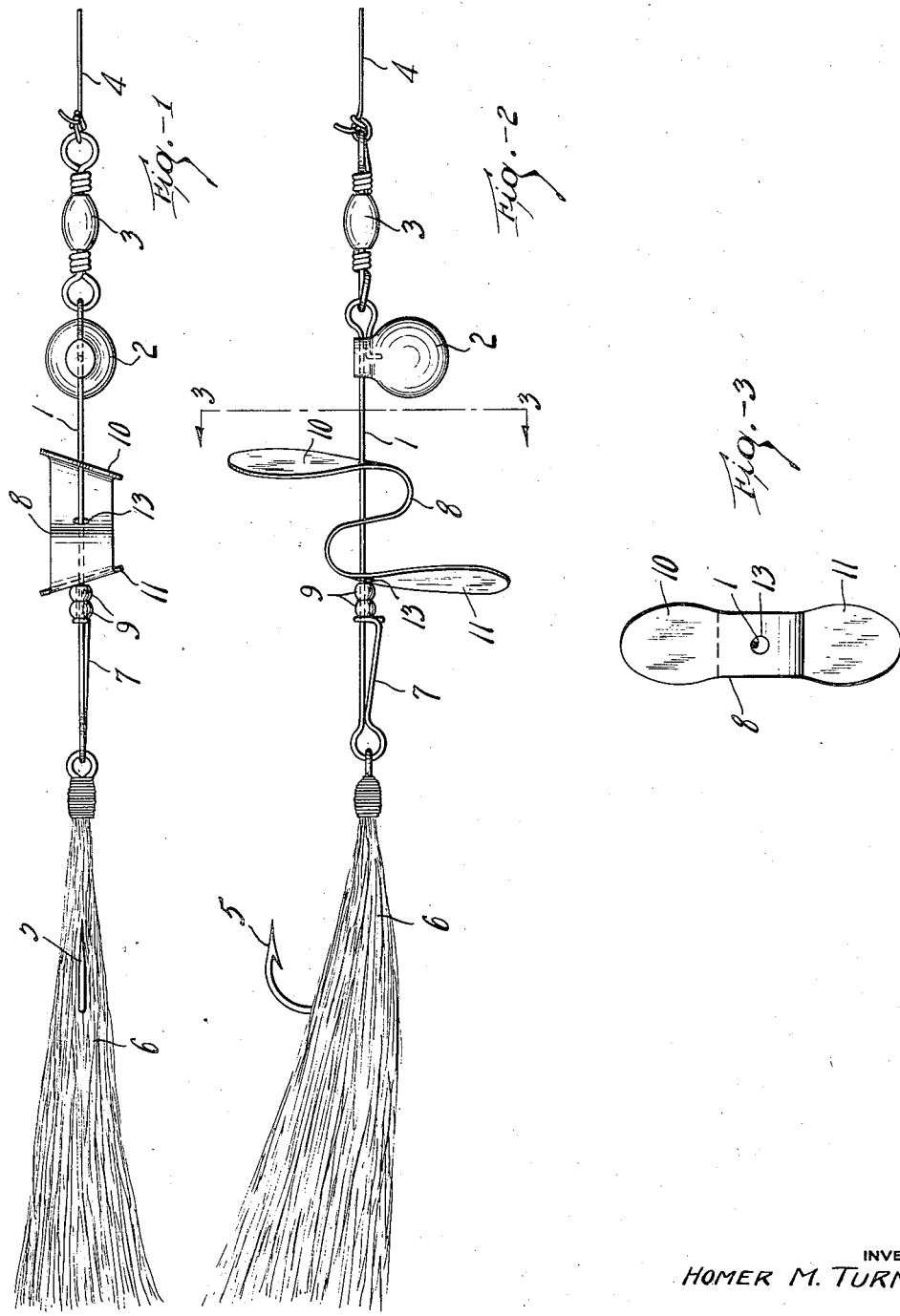
INVENTOR
HOMER M. TURNER
BY
Ely & Barrow
ATTORNEYS Patented July 6, 1937

2,086,008

UNITED STATES PATENT OFFICE 2,086,008

FISHING TACKLE

Homer M. Turner, Hillsboro, Ohio, assignor to The Enterprise Manufacturing Company, Akron, Ohio, a corporation of Ohio Application May 11, 1934, Serial No. 725,148

10 Claims. (Cl. 43—45)

The present invention relates to fishing tackle and particularly to artificial baits, and while the invention is shown in connection with a casting bait, it may be employed with other baits and in other combinations than that shown specifically herein.

The particular feature of patentability, in combination with a standard type of complete bait as shown, is the new form of spinner. The invention is intended to improve upon the double or twin spinners which have been very successful, and which are well-known and recognized articles of commerce. The usual double spinner consists of a pair of two-bladed spinners mounted upon a shaft connected to the line and hook.

The present form of spinner gives substantially the same effect as the double spinner, but is made in one piece with oppositely extending blades spaced longitudinally of the shaft. This is a less expensive type of spinner and is lighter in weight than the dual spinner of the prior art, while it gives a similar effect. In addition the spinner is slightly unbalanced which gives a greater "kick" or vibration to the bait while in action.

Due to the construction of the spinner the two blades are kept at a constant distance apart, thus avoiding the tendency of dual spinners to approach each other in operation or the necessity of providing spaced bearings for the spinners. The spinner is very responsive to the water and will start spinning immediately.

These and other objects and advantages will be seen to flow from the improved spinner construction, it being obvious that changes and modifications may be made within the scope of the invention.

In the drawing,

Figure 1 is a plan view of a complete bait of the casting type showing the spinner in edge view;

Figure 2 is a side elevation thereof showing the spinner in side view;

Figure 3 is a section on the line 3—3 of Figure 2.

The complete bait in which the spinner element is incorporated comprises a rigid shaft 1 to which may be connected a casting weight or sinker 2. To the forward end of the shaft the line 4 is connected through the medium of a swivel 3. At the rear of the shaft is supported a hook 5 having a lure thereon as shown in the bucktail 6, the end of the shaft being formed as a snap-loop 7.

Between the loop 7 and the weight is located the spinner, indicated in general by the numeral 8, a pair of beads 9 being located directly above the loop to act as a bearing for the spinner.

The spinner 8 is formed from a single strip of light metal which is bent in a reverse curve so as to define a general S-shape structure having its ends extended to form two lobes or blades 10 and 11 extending radially of the axis of rotation of the spinner. The lobes are preferably enlarged and are bent at oblique angles to the plane of the spinner so as to present active spinning surfaces to the water. The shaft 1 is passed through the central portion of the spinner, thus piercing the body of the spinner at three spaced points about which the spinner rotates. This gives a three point bearing for the spinner which supports it adequately. It will be noted that the openings 13 in the center of the spinner are somewhat larger than the diameter of the shaft so that considerable freedom of movement is allowed to the spinner. Any unevenness in the rotation of the spinner is thus transmitted to the shaft resulting in a greater "kick" or liveliness to the bait. This action may be accentuated by making the lobes or blades of unequal size, if desired.

When the spinner is rotating the two blades 10 and 11 move in separate spaced planes so that the visual effect of the dual or twin spinner is obtained with a single spinner member. These planes of rotation are spaced apart at a fixed distance which is more effective than a two-bladed spinner operating in the same plane. The spinner is light in weight and instantly effective in operation. The spinner and the shaft make substantially a figure like a $ when viewed from one side of the bait, which figure is reversed, as shown in Figure 2, when viewed from the opposite side thereof.

Exact conformity with the detailed description and showing is not necessary or essential, variations and modifications being permitted in the scope of the claims as will be understood by those skilled in this art. As far as known to me, it is new to provide a unitary, multiple-bladed spinner in which the blades move in different planes of rotation. In the form shown in the drawing, these blades are oppositely directed, this, however, being non-essential in the broader aspects of the invention.

What is claimed is:

1. An artificial bait having a bearing shaft and a spinner located upon the shaft, said spinner comprising a single strip of metal bent in a reverse curve to substantial S-shape with diametrically oppositely projecting blades at the extremities thereof, the shaft passing through the spinner.

2. An artificial bait having a bearing shaft and a spinner located upon the shaft, said spinner being fashioned from a straight blank of material bent in a reverse curve so that a plane passing through the shaft and the medial plane of the spinner will define a $ shape.

3. An artificial bait having a bearing shaft, a spinner located upon the shaft, said spinner and shaft together forming a $-shape, and blades upon the extremities of the spinner extending in diametrically opposite directions from said shaft.

4. A spinner bent in a reverse curve to the general form of a letter S with blades on the extremities thereof extending radially of its axis of rotation in diametrically opposite directions.

5. A one-piece spinner having a centrally disposed axis of rotation and blades extending radially of its axis of rotation in different planes of rotation.

6. A one-piece spinner having a central axis of rotation and blades extending radially of its axis of rotation in diametrically opposite directions therefrom and in different planes of rotation.

7. A one-piece spinner having a central axis of rotation and blades extending radially of the axis of rotation thereof in different planes of rotation and at opposed oblique angles.

8. A one-piece spinner having a central axis of rotation and blades extending radially of the axis of rotation thereof in diametrically opposite directions, in different planes of rotation and at opposed oblique angles with relation to each other.

9. A one-piece spinner having blades extending radially of the axis of rotation thereof in diametrically opposite directions therefrom, in different parallel planes of rotation and at opposed oblique angles, and a shaft extending through the axis of the spinner.

10. A unitary spinner having blades extending radially of the axis of rotation thereof in diametrically opposite directions, in parallel spaced apart, planes of rotation and at opposed oblique angles, and a shaft extending through the axis of the spinner.

HOMER M. TURNER.